United States Patent
Kim et al.

(10) Patent No.: US 8,983,056 B2
(45) Date of Patent: Mar. 17, 2015

(54) COMMUNICATION SYSTEM AND CALL CONNECTING METHOD THEREOF

(71) Applicant: Woowa Brothers Co., Ltd, Seoul (KR)

(72) Inventors: Bong Jin Kim, Seoul (KR); Yong Cheol Kwon, Seoul (KR)

(73) Assignee: Woowa Brothers Co., Ltd, Seoul (KR)

( * ) Notice: Subject to any disclaimer, the term of this patent is extended or adjusted under 35 U.S.C. 154(b) by 0 days.

(21) Appl. No.: 14/036,899

(22) Filed: Sep. 25, 2013

(65) Prior Publication Data

US 2014/0024346 A1 Jan. 23, 2014

Related U.S. Application Data

(63) Continuation-in-part of application No. 13/578,185, filed on Aug. 9, 2012, now abandoned.

(30) Foreign Application Priority Data

Oct. 14, 2011 (KR) .................. 10-2011-0105542

(51) Int. Cl.
*H04M 1/00* (2006.01)
*H04W 4/16* (2009.01)
*H04M 3/42* (2006.01)

(52) U.S. Cl.
CPC . *H04W 4/16* (2013.01); *H04M 3/42* (2013.01)
USPC ................ 379/373.01; 379/374.01

(58) Field of Classification Search
CPC ... H04M 19/02; H04M 19/041; H04M 19/04; H04M 3/42017; H04M 3/4878
USPC .......... 379/114.13, 252, 257, 373.01–373.04, 379/374.01, 374.02
See application file for complete search history.

(56) References Cited

U.S. PATENT DOCUMENTS

| | | | |
|---|---|---|---|
| 7,142,656 B2 * | 11/2006 | Moody et al. | 379/207.16 |
| 8,081,751 B1 * | 12/2011 | Martin et al. | 379/373.01 |
| 2004/0220851 A1 | 11/2004 | Silver et al. | |
| 2007/0105531 A1 | 5/2007 | Schroeder, Jr. | |
| 2007/0274308 A1 | 11/2007 | Kodaka | |
| 2008/0123830 A1 * | 5/2008 | Shah et al. | 379/201.01 |
| 2010/0173605 A1 | 7/2010 | Moraes | |
| 2010/0215163 A1 | 8/2010 | Kashen | |
| 2011/0191189 A1 * | 8/2011 | Baiz Matuk | 705/14.66 |
| 2013/0003942 A1 | 1/2013 | Bennett | |

FOREIGN PATENT DOCUMENTS

| | | |
|---|---|---|
| JP | H0819016 A | 1/1996 |
| JP | 2003309876 A | 10/2003 |
| JP | 2007266799 A | 10/2007 |
| JP | 2009044310 A | 2/2009 |
| KR | 10-1998-0019082 | 5/1998 |
| KR | 10-1999-0042964 | 10/1999 |
| KR | 10-2000-0011602 | 3/2000 |

* cited by examiner

*Primary Examiner* — Quoc D Tran
(74) *Attorney, Agent, or Firm* — Brinks Gilson & Lione (57) ABSTRACT

A communication system determining a virtual number of a receiver's terminal included in a call connecting request signal when a caller's terminal makes a call connection request to the receiver's terminal and providing a ring back tone or a sound message corresponding to the virtual number, and a method thereof are disclosed.

14 Claims, 6 Drawing Sheets

| VIRTUAL NUMBER | SOUND MESSAGE |
|---|---|
| 050-111-XXXX | SOUND MESSAGE 1 |
| 050-222-XXXX | SOUND MESSAGE 2 |
| 050-225-XXXX | |
| 050-333-XXXX | SOUND MESSAGE 3 |
| ⋮ | ⋮ |

(b)

| VIRTUAL NUMBER | COMMENT | SOUND MESSAGE |
|---|---|---|
| 050-111-XXXX | COMMENT ACCORDING TO LOCATION INFORMATION | SOUND MESSAGE 1 |
| 050-222-XXXX | | SOUND MESSAGE 2 |
| 050-225-XXXX | | |
| 050-333-XXXX | | SOUND MESSAGE 3 |
| ⋮ | ⋮ | ⋮ |

COMMUNICATION SYSTEM AND CALL CONNECTING METHOD THEREOF

This application claims the benefit under 35 U.S.C. §120 as a continuation-in-part of U.S. patent application Ser. No. 13/578,185, filed Aug. 9, 2012, and claims the benefit under U.S.C. §119(a) of Korean Application No. KR 10-2011-0105542, filed Oct. 14, 2011, the entirety of which are hereby incorporated by reference.

BACKGROUND OF THE INVENTION

1. Field of the Invention

The present invention relates to a communication system and a call connecting method thereof, and more particularly, to a communication system determining a virtual number of a receiver's terminal included in a call connecting request signal when a caller's terminal makes a call connection request to the receiver's terminal and providing a ring back tone or a sound message corresponding to the virtual number, and a method thereof.

2. Description of the Prior Art

An existing call reception waiting sound service (for example, ColorRing by SK Telecom, RingToYou by K T Freetel, or Feeling Service by LG Telecom), which is a service allowing a user to subscribe to a web site providing a call reception waiting sound service through the Internet to set a desired call reception waiting sound (for example, a music, a ring tone, or the like), provides the music or the ring tone set by the user (receiver) to a caller for a call waiting time of the caller. Currently, this service has been provided in a general telephone as well as a mobile communication terminal.

Meanwhile, a virtual number providing service capable of allocating a virtual phone number instead of an actual phone number and using the virtual phone number for a predetermined period has been provided. When the virtual number providing service as described above is used, exposure of information on an actual phone number or a cellular phone number may be prevented and a single terminal may receive calls made to several receiving phone numbers.

The call reception waiting sound service and the virtual number providing service as described above have provided the music set by the receiver to the caller or have provided only a basic function allowing the actual phone number not to be exposed using the virtual phone number.

SUMMARY OF THE INVENTION

Accordingly, the present invention has been made to solve the above-mentioned problems occurring in the prior art while advantages achieved by the prior art are maintained intact.

One subject to be achieved by the present invention is to provide a system capable of allowing each of a receiver and a caller to hear sound messages and ring back tones and then recognize additional information (for example, receiver information, an order route, or the like) by setting one or more virtual numbers in one terminal and individually matching the sound messages to the virtual numbers, in order to overcome a limitation of the service described above.

In one aspect of the present invention, there is provided a communication system controlling a call connection between a caller's terminal and a receiver's terminal having one or more virtual numbers, including: a call connection server configured to perform the call connection between the caller's terminal and the receiver's terminal in response to a call connection request received from the caller's terminal; and an information providing server configured to detect a sound message and a ring back tone corresponding to a virtual number of the receiver's terminal included in the call connection request transmitted from the call connection server, outputting the detected sound message to the receiver's terminal, and outputting the detected ring back tone to the caller's terminal, wherein the call connection server blocks transmission of voice between the caller's terminal and the receiver's terminal until the output of at least any one of the ring back tone and the sound message ends.

In another aspect of the present invention, there is provided a call connecting method of a communication system controlling a call connection between a caller's terminal and a receiver's terminal having one or more virtual numbers, including: receiving a call connection request from the caller's terminal; extracting a sound message and a ring back tone corresponding to a virtual number of the receiver's terminal included in the call connection request; transmitting a call connection reception request to the receiver's terminal; transmitting the ring back tone to the caller's terminal; receiving a call connection response signal from the receiver's terminal and starting the call connection between the caller's terminal and the receiver's terminal; and transmitting the sound message to the receiver's terminal, wherein the communication system blocks transmission of voice between the caller's terminal and the receiver's terminal until the output of at least any one of the ring back tone and the sound message ends.

BRIEF DESCRIPTION OF THE DRAWINGS

The above and other objects, features and advantages of the present invention will be more apparent from the following detailed description taken in conjunction with the accompanying drawings, in which.

Throughout the accompanying drawings, the same reference numerals will be used to denote the same components.

DETAILED DESCRIPTION OF THE PREFERRED EMBODIMENTS

Hereinafter, exemplary embodiments of the present invention will be described with reference to the accompanying drawings. It is to be noted that in giving reference numerals to components of each of the accompanying drawings, the same components will be denoted by the same reference numerals even though they are shown in different drawings. Further, in describing exemplary embodiments of the present invention, well-known constructions or functions will not be described in detail since they may unnecessarily obscure the understanding of the present invention. In the present specification, "including" any components will be understood to imply the inclusion of other components.

Figure 1:
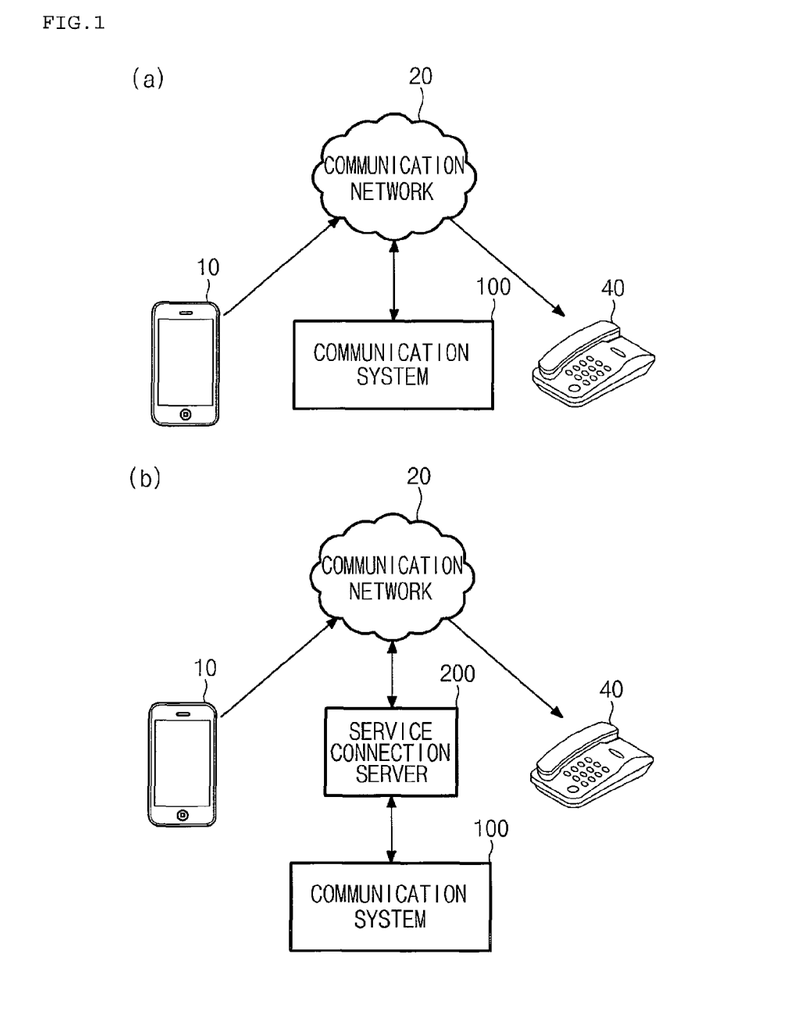
FIGS. 1A and 1B are block diagrams showing a network connection of a communication system according to an exemplary embodiment of the present invention.

FIGS. 1A and 1B are block diagrams showing a network connection of a communication system according to an exemplary embodiment of the present invention.

Referring to FIG. 1A, the communication system according to the exemplary embodiment of the present invention is connected to a caller's terminal 10 and a receiver's terminal 40 through a communication network 20. Referring to FIG. 1B, a service connection server 200 is additionally provided, and the caller's terminal 10, the receiver's terminal 40, and the service connection server 200 are connected to each other through the communication network 20.

Referring to FIGS. 1A and 1B, the caller's terminal 10 and the receiver's terminal 40, which are terminals capable of performing transmission and reception of voice, data, or the like, therebetween, may include, for example, a mobile telephone, a smart phone, a smart pad, a telephone, a tablet personal computer, a personal computer, a personal digital assistant (PDA), or the like.

Although the case in which the caller's terminal 10 is a mobile communication terminal using a mobile network and the receiver's terminal 40 is a wired terminal using a wired network is shown in FIGS. 1A and 1B, the present invention is not limited thereto. That is, both of the mobile communication terminal and the wired terminal may be applied to both of the caller's terminal and the receiver's terminal.

The communication network 20 may mainly include a wired network and a mobile network. The wired network means a communication network connected to a terminal of a subscriber in a wired scheme to allow the subscriber to perform a call in a designated location, such as an existing public switched telephone network (PSTN) or integrated services digital network (ISDN). The mobile network, which is a mobile communication network served in a scheme such as an advanced mobile phone systems (AMPS) scheme, a time division multiple access (TDMA) scheme, or a code division multiple access (CDMA) scheme, means a communication network connected to a terminal of a subscriber in a wireless scheme to allow the subscriber to perform a call at any location. The present invention may be applied to both of the wired network and the mobile network, and the communication system 100 is disposed at an appropriate location of the wired network or the mobile network.

Meanwhile, a calling subscriber is a person (hereinafter, referred to as a caller) making a call using the caller's terminal 10, and a receiving subscriber is a person (hereinafter, referred to as a receiver) receiving a call using the receiver's terminal 40. The caller and the receiver may be positioned in the same communication network or in different communication networks. The present invention may include both of the case in which the caller uses the wired network and the mobile network and the case in which the receiver uses the wired network and the mobile network.

As shown in FIG. 1A, the caller's terminal 10 and the receiver's terminal 40 connected to the communication system 100 through the communication network 20 may receive a preset sound message and/or ring back tone provided from the communication system 100.

The communication system 100 may individually set and provide the sound messages with respect to one or more virtual numbers set in the receiver's terminal 40 according to a selection or a request of the receiver. To this end, the receiver (service subscriber) may generate a plurality of virtual numbers with respect to a general phone number allocated to the receiver's terminal 40. The plurality of virtual numbers may be generated by the communication system 100 according to the request of the receiver, and the communication system 100 may allocate the plurality of virtual numbers to a phone number of the receiver's terminal 40 or change/cancel the allocated virtual numbers according to the request of the receiver.

Figure 3:
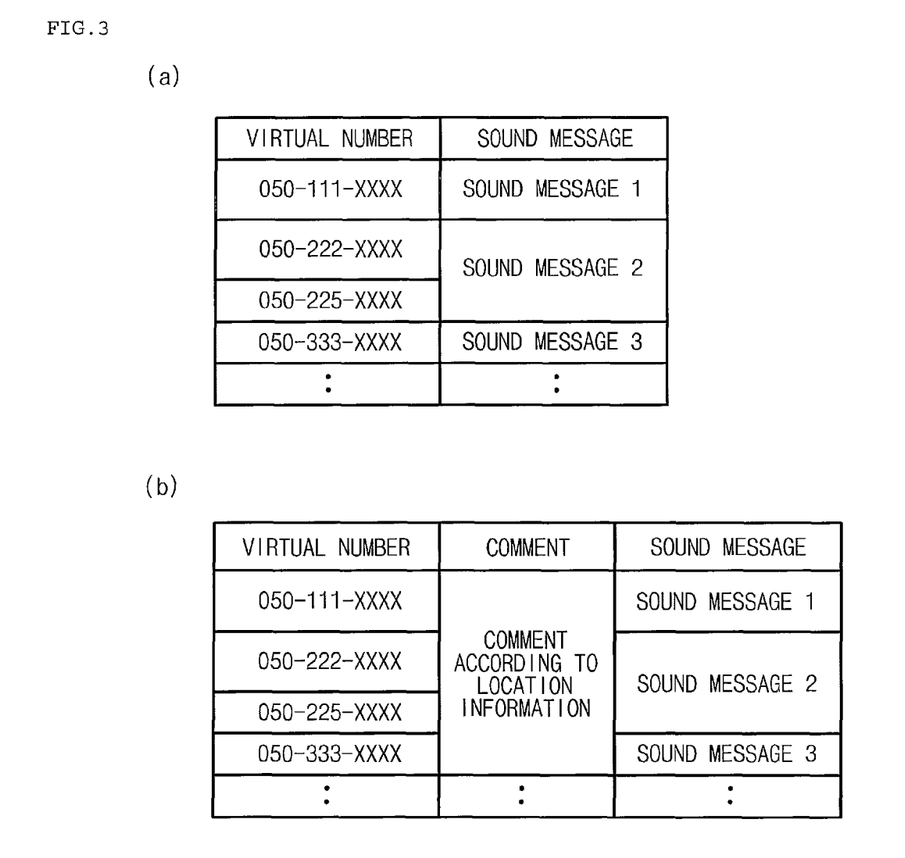
FIGS. 3A and 3B are diagrams showing a matching method between virtual numbers and sound messages according to the exemplary embodiment of the present invention.

In the exemplary embodiment of the present invention, the communication system 100 may set different sound messages with respect to each of the plurality of virtual numbers. For example, the communication system 100 advertises different virtual numbers for each advertisement medium and sets different sound messages for the respective virtual numbers, such that an advertiser (receiver) may determine through what advertisement medium a call is made only by hearing the sound message. The communication system 100 may match the virtual numbers and the sound messages to each other and then store a matching result therein or in a separate database (not shown). The matching between the virtual numbers and the sound messages will be described in more detail with reference to FIG. 3.

Hereinafter, the case in which the caller makes a call connection request using a specific virtual number will be described. When the caller makes a call to the receiver's terminal 40, a call connection request signal is transmitted to the communication system 100. Here, the call connection request signal may include information on one of the virtual numbers of the receiver's terminal 40. As another example, the call connection request signal may also include information on a location at which the caller's terminal 10 transmits the call connection request signal.

The communication system 100 may receive the call connection request signal, extract information on the virtual numbers included in the call connection request signal, and output the sound message corresponding to the extracted virtual number to the receiver's terminal 40 according to the extracted virtual number. Meanwhile, the communication system 100 may transmit a default sound message in the case in which a sound message corresponding to the virtual number is not set.

As described above, the communication system 100 may generate one or more virtual numbers with respect to one receiver's terminal 40 and set sound messages for the respective virtual numbers to provide additional information (for example, a phone route, location information, and the like, of the caller) through the sound messages.

Meanwhile, as another example, as shown in FIG. 1B, the service connection server 200 may be additionally provided. The service connection server 200 serves to determine only signals of subscribers subscribing to a sound message providing service among the call connection request signals transmitted from the caller's terminal 10 and transmit the determined signals to the communication system 100, in order to decrease a load applied to the communication system 100. The service connection server 200 may be managed by a manager different from that of the communication system 100.

Although not shown, a separate sound message setting terminal for user registration, sound message setting/changing/canceling, and the like, may also be additionally provided. For example, the separate terminal may be implemented in various forms such as a mobile telephone, a smart phone, a telephone, a tablet personal computer, a personal computer, a personal digital assistant (PDA), and the like. That is, the user registration, the sound message setting/ changing/canceling, and the like, may be performed by the receiver's terminal 40 directly accessing the communication system 100 or be performed by the separate sound message setting terminal accessing the communication system 100.

Figure 2:
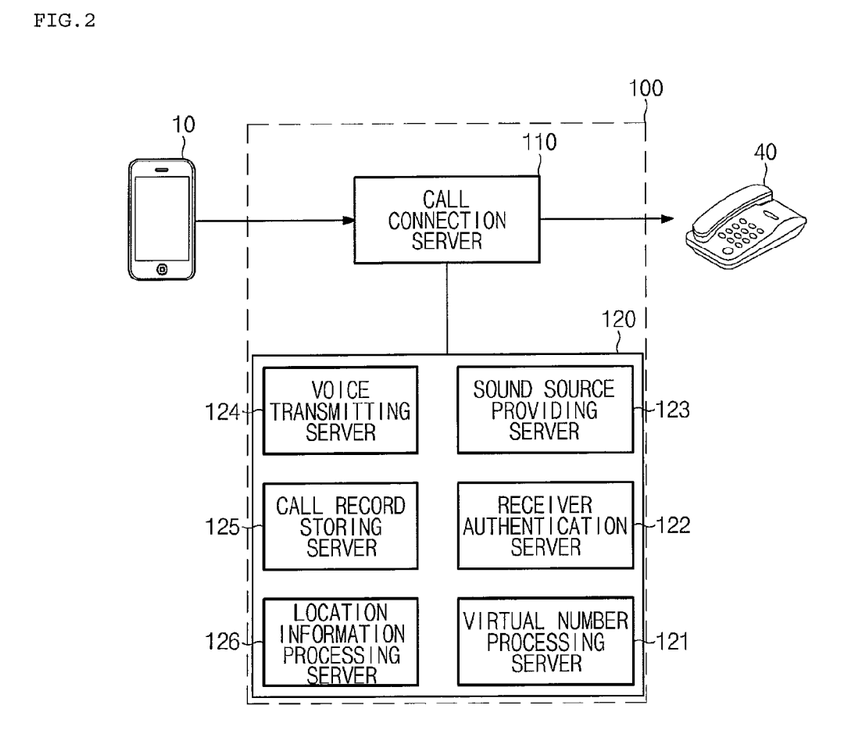
FIG. 2 is a block diagram showing components of the communication system according to the exemplary embodiment of the present invention in more detail.

FIG. 2 shows components of the communication system according to the exemplary embodiment of the present invention in more detail.

Referring to FIG. 2, the communication system 100 according to the exemplary embodiment of the present invention may include a call connection server 110 and an information providing server 120. The information providing server 120 may include a virtual number processing server 121, a receiver authentication server 122, a sound source providing server 123, a voice transmitting server 124, a call record storing server 125, and a location information processing server 126.

Although the case in which the virtual number processing server 121, the receiver authentication server 122, the sound source providing server 123, the voice transmitting server 124, the call record storing server 125, and the location information processing server 126 described above are independently implemented according to functions has been shown, they may also be implemented as a single integrated server.

The call connection server 110 may process the call connection request signal transmitted from the caller's terminal 10. For example, when the call connection server 110 receives the call connection request signal transmitted from the caller's terminal 10, it may transmit a call connection reception request signal to the receiver's terminal 40. When the call connection server 110 receives a call connection response signal transmitted from the receiver's terminal 40, it will start a call connection between the caller's terminal 10 and the receiver's terminal 40. In addition, the call connection server 110 may transmit the call connection request signal received from the caller's terminal 10 to the receiver authentication server 122 and the sound source providing server 123 of the information providing server 120.

The virtual number processing server 121 serves to generate one or more virtual numbers with respect to a phone number of the receiver's terminal 40. For example, a user of the receiver's terminal 40 may access the virtual number processing server 121 of the information providing server 120 to generate one or more virtual numbers. The generated virtual number may interwork with the receiver authentication server 122 and the sound source providing server 123.

The receiver authentication server 122 may determine whether or not the user of the receiver's terminal 40 is a subscriber of a sound message service using the virtual number of the receiver's terminal 40 included in the call connection request signal. The receiver authentication server 122 may transmit a determining result of whether or not the user of the receiver's terminal 40 is the subscriber of the sound message service to the sound source providing server 123. As an example, the receiver authentication server 122 may be implemented so that the call connection server 110 transmits the call connection request signal to the receiver's terminal 40 only in the case in which it is determined that the user of the receiver's terminal 40 is the subscriber of the sound message service. As another example, the receiver authentication server 122 may be implemented so as to transmit information indicating that the user of the receiver's terminal 40 is not the subscriber of the sound message service to the sound source providing server 123 in the case in which it is determined that the user of the receiver's terminal 40 is not the subscriber of the sound message service, thereby outputting a default sound message.

The sound source providing server 123 may transmit a ring back tone to be output to the caller's terminal 10 and a sound message to be output to the receiver's terminal 40 to the call connection server 110. The call connection server 110 will transmit the ring back tone and the sound message to the caller's terminal 10 and the receiver's terminal 40, respectively. Here, the ring back tone means a call reception waiting sound that the caller may hear at the time of waiting for a call and may include a specific advertisement comment or logo song configured of music and/or voice. In the case of outputting the advertisement comment and the logo song, since an advertisement is transmitted in a state in which the caller pays attention before a call, an advertisement effect may be maximized and target marketing may be made in consideration of a category of business, or the like, of the receiver. In addition, here, the sound message may include various types of messages such as a ring tone (for example, "ding dong dang"), a specific alarm sound (for example, "a call is made through xx communication system"), a logo song, and the like, that the receiver may hear at the time of receiving the call through the communication system 100. Further, in the case in which the call is received by the receiver's terminal 40, the sound message may be generally provided separately from or provided in addition to an output ring tone.

In addition, the sound source providing server 123 may transmit the sound message including location information transmitted from the location information processing server 126 to the call connection server 110 based on the location information. The sound message including the location information may include, for example, a location information voice comment.

Meanwhile, the above-mentioned ring back tone and sound message may be set in advance by a manager of the communication system 100 or the user of the receiver's terminal 40. For example, the ring back tone may be set in advance by the manager of the communication system 100 according to a request from the user of the receiver's terminal 40. In addition, for example, the sound message may be set in advance by the manager of the communication system 100 regardless of intention of the user of the receiver's terminal 40.

The voice transmitting server 124 may transmit call voice between the caller's terminal 10 and the receiver's terminal 40.

The call record storing server 125 may store a call record between the caller's terminal 10 and the receiver's terminal 40. The call record stored in the call record storing server 125 may be used to generate various statistical data on a call made to the receiver's terminal 40 and perform charging depending on the use of the communication system 100.

The location information processing server 126 introduces a location based service concept to extract the location information of the caller's terminal 10 included in the call connection request signal. The location information processing server 126 may transmit the extracted location information of the caller's terminal 10 to the sound source providing server 123. The location based service means wireless content services providing specific information depending on a changed location of the user to the user. The location based service may be used to provide various information on a general life such as traffic information, location tracking information, and the like, as well as product information, based on location information of a customer.

For example, when an area in which the caller's terminal 10 is currently located is an area L, the sound source providing server 123 may extract a 'sound message 1' corresponding to the virtual number of the caller's terminal 10 included in the call connection request signal and a 'comment 1' corresponding to the location information, and the receiver's terminal 40 may add a message corresponding to the location information, such as an 'order call was received from the L region", which is the comment 1, to the sound message 1 and transmit the sound message 1 to the outside. As described above, according to the exemplary embodiment of the present invention, since the comment representing the location information is transmitted together with the sound message, the receiver may directly know a location of the caller, thereby making it possible to facilitate a response to the customer and improve customer satisfaction. The above-mentioned content will be described in more detail with reference to FIGS. 3A and 3B.

FIGS. 3A and 3B are diagrams showing a matching method between virtual numbers and sound messages according to the exemplary embodiment of the present invention, wherein FIG. 3A shows examples of sound messages allocated to virtual numbers; and FIG. 32 shows examples in which comments corresponding to location information of a caller's terminal are set to be output together with sound messages allocated to virtual numbers.

FIG. 3A shows an example in which a plurality of virtual numbers are allocated to one receiver's terminal 40 and different sound messages are set with respect to the respective virtual numbers. The communication system 100 may set a sound message 1 to be reproduced with respect to a virtual number starting with 050-111- among the plurality of virtual numbers, set a sound message 2 to be reproduced with respect to a virtual number starting with 050-222- or 050-225- among the plurality of virtual numbers, and set a sound message 3 to be reproduced with respect to a virtual number starting with 050-333- among the plurality of virtual numbers.

FIG. 3B shows a case in which comments representing location information are additionally output together with the sound messages in the case in which the different sound messages are set with respect to the respective virtual number as in the example FIG. 3A. As an example, the call connection request signal transmitted from the caller's terminal 10 may include location information of the caller's terminal 10. When the communication system 100 receives the call connection request signal including the location information, the location information processing server 126 (See FIG. 2) may extract the location information and output the sound message (for example, the comment shown in FIG. 3B) corresponding to the location information together with a preset sound message.

For example, in the case in which the caller's terminal is located in "Seocho-dong", when the caller's terminal 10 makes a call to 050-222-XXXX, the receiver's terminal 40 may be implemented so as to reproduce a sound message 2 after a comment "Seocho-dong". Through the above-mentioned service, the receiver may receive a call in a state in which he/she recognizes an approximate location of the caller in advance and may recognize other information (for example, through what advertisement medium the call is made) of the caller through the sound message 2.

Although the case in which a comment informing the location information is transmitted has been shown in the present example, a ring tone or music capable of recognizing the location information may also be output in another example. As still another example, a sex distinction, an age, and the like, of the caller may also be output through the sound message in a range in which collection and use of personal information are possible. As another example, the location information may be implemented to be included in the call connection request signal only in the case in which the user permits the location information to be collected, for security.

As an example, the user of the receiver's terminal 40 may set virtual numbers for each food menu. For example, a user running a restaurant at night may separately generate a phone number (virtual number 050-111-XXXX) for receiving an order for food A, a phone number (virtual number 050-222-XXXX) for receiving an order for food B, and a phone number (virtual number 050-333-XXXX) for receiving an order for food C to know what is a food to be ordered though the call at the moment at which a phone is rung.

In addition, the user may separately generate a virtual number written on an advertisement leaflet, a virtual number written on the Internet portal site (for example, Naver, or the like), and a virtual number written on an application (for example, an application for informing delivery specialty store information and making a connection to the delivery specialty store) for a smart phone in order to confirm advertisement effects of various media.

Further, the above-mentioned two examples may also be implemented to be combined with each other to separately generate a phone number (virtual number 050-111-10XX) written on an advertisement leaflet in order to receive an order for food A, a phone number (virtual number 050-111-11XX) written on the Internet portal site in order to receive an order for food A, a phone number (virtual number 050-111-12XX) written on an application for a smart phone in order to receive an order for food A, a phone number (virtual number 050-222-10XX) written on an advertisement leaflet in order to receive an order for food B, a phone number (virtual number 050-222-11XX) written on the Internet portal site in order to receive an order for food B, a phone number (virtual number 050-222-12XX) written on an application for a smart phone in order to receive an order for food B, a phone number (virtual number 050-333-10XX) written on an advertisement leaflet in order to receive an order for food C, a phone number (virtual number 050-333-11XX) written on the Internet portal site in order to receive an order for food C, and a phone number (virtual number 050-333-12XX) written on an application for a smart phone in order to receive an order for food C and generate different sound messages that may be recognized by the user with respect to the respective virtual numbers.

According to the exemplary embodiment of the present invention as described above, after an advertisement is executed through a plurality of advertisement media, individual business contributions of the respective advertisement media may be accurately known. In addition, since an object of a call of the caller may be known as soon as the phone is rung, the response to the customer may be facilitated and the customer satisfaction may be improved. Further, the plurality of virtual numbers are matched to one phone number, thereby making it possible to decrease a cost.

Figure 4:
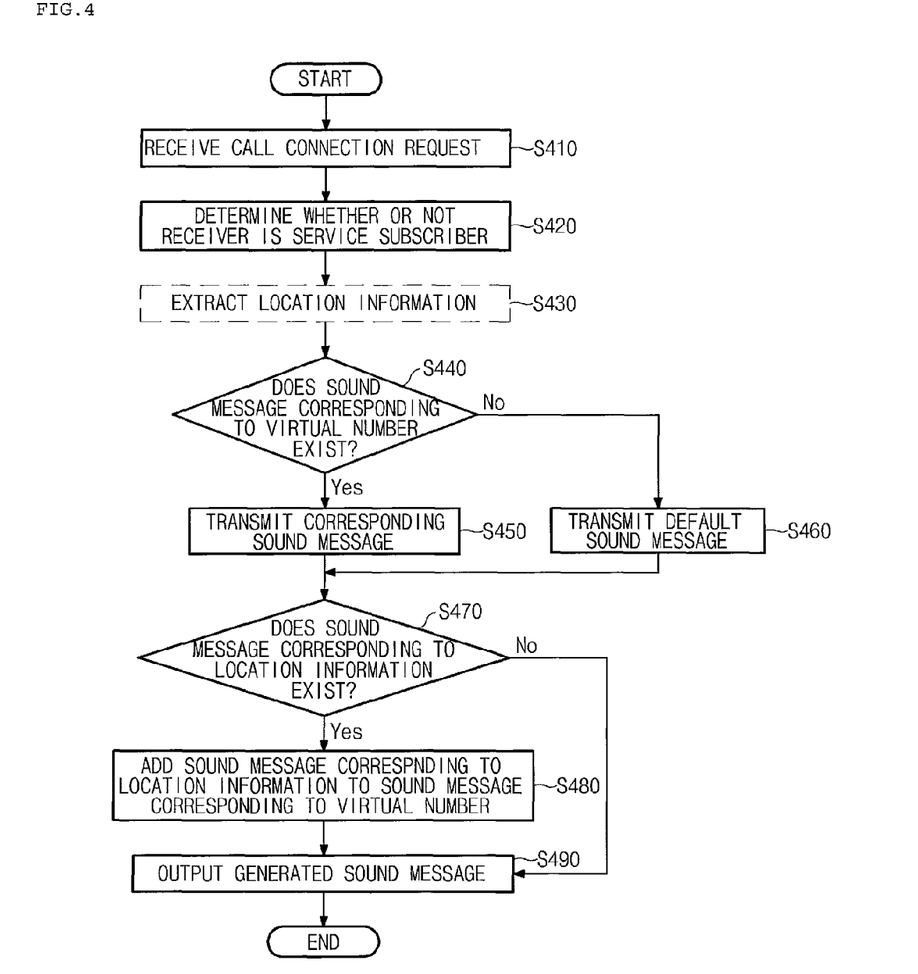
FIG. 4 is a flow chart showing a call connecting method of a communication system according to the exemplary embodiment of the present invention.

FIG. 4 is a flow chart showing a call connecting method of a communication system according to the exemplary embodiment of the present invention. As described above with reference to FIGS. 1 to 3B, it is assumed in an example described with reference to FIG. 4 that one or more virtual numbers are set in the receiver's terminal 40 and sound messages are set with respect to each of the virtual numbers.

First, when the caller's terminal 10 transmits the call connection request signal for a voice call or data communication, the communication system 100 receives the call connection request signal (S410). Here, the call connection request signal may include a virtual phone number of the receiver's terminal 40 and further include information (for example, location information) of the caller.

Then, it is determined whether or not the receiver is a service subscriber through the received call connection request signal (S420). This determination may be performed by the receiver authentication server 122 of the information providing server 120. In addition, in the case in which it is determined that the receiver is not the service subscriber, a default sound message may be directly transmitted to the receiver's terminal 10.

Further, optionally, an operation of extracting the location information of the caller's terminal may be performed (S430). In the operation of extracting the location information, the location information of the caller included in the call connection request signal is extracted, wherein the location information of the caller may be included in the call connection request signal transmitted from the caller's terminal 10.

When the communication system 100 receives the call connection request signal from the caller's terminal 10, it may extract the virtual number of the receiver's terminal 40 and confirm whether a sound message corresponding to the virtual number exists (S440). When the sound message corresponding to the extracted virtual number does not exist, a default sound message may be transmitted to the receiver's terminal 40 (S460), and when the sound message corresponding to the extracted virtual number exists, a corresponding sound message may be transmitted to the receiver's terminal (S450).

For example, in the case in which the location information is extracted in S430, it is determined whether a sound message (for example, a location information comment) corresponding to the location information exists (S470). In the case in which the location information is extracted and the sound message corresponding to the location information exists, the sound message corresponding to the location information may be added to the sound message corresponding to the virtual number extracted in S450 (S480). Therefore, a sound message generated by combining the sound message corresponding to the location information and the sound message corresponding to the virtual number with each other may be output or the sound message corresponding to the virtual number may be output (in the case in which a reception alarm sound corresponding to the location information does not exist) (S490).

Figure 5:
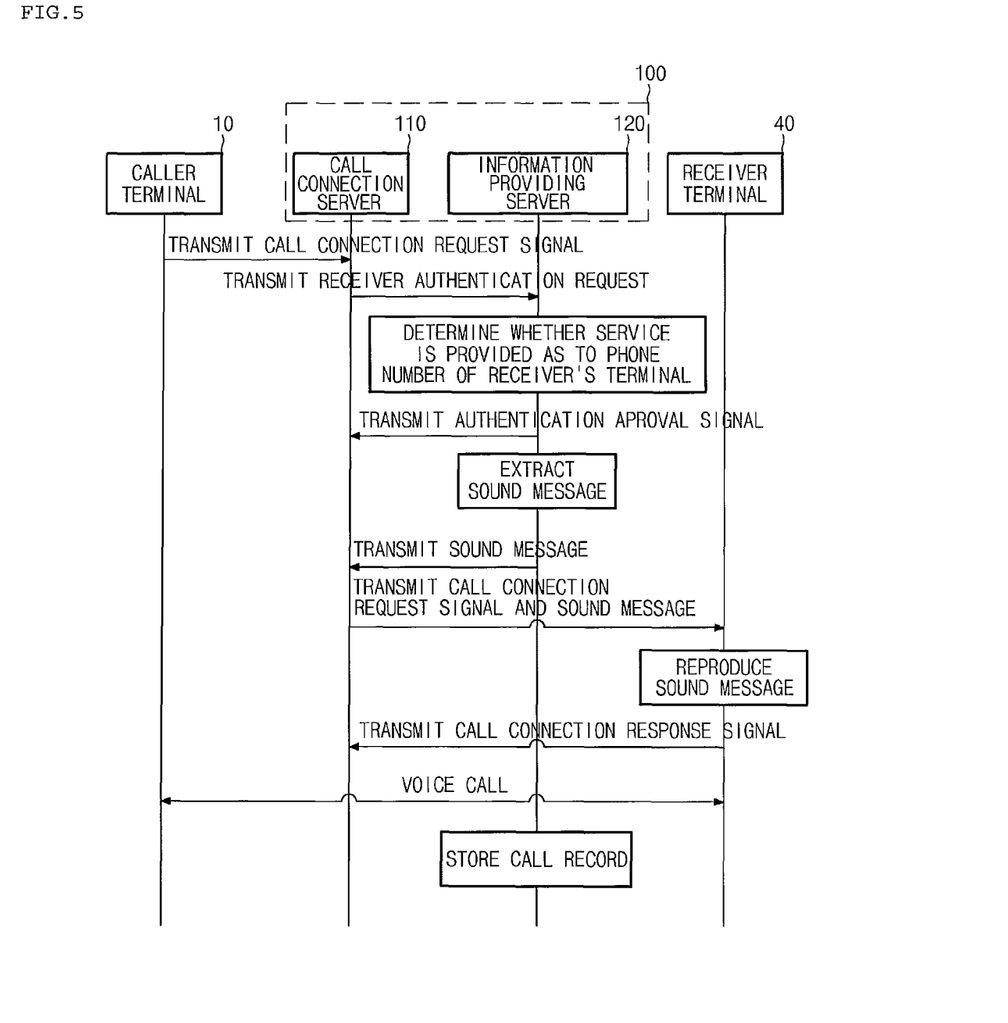
FIG. 5 is a flow chart showing a call connecting method of a communication system according to another exemplary embodiment of the present invention, more specifically, a process of providing a sound message through the communication system.

FIG. 5 is a flow chart showing a call connecting method of a communication system according to another exemplary embodiment of the present invention, more specifically, a process of providing a sound message through the communication system.

As described above with reference to FIG. 4, it is assumed that the communication system 100 allocates one or more virtual numbers to the receiver's terminal in advance and sets and stores sound messages with respect to each of the virtual numbers.

First, a predetermined call connection request signal is transmitted from the caller's terminal 10 to the call connection server 110. The call connection request signal transmitted from the caller's terminal 10 includes phone number information of the receiver's terminal 40 of a receiver with which a caller wants to speak. Here, the phone number of the receiver's terminal 40 may be a virtual number set by the receiver. Meanwhile, a calling exchange may be interposed between the call connection server 110 and the caller's terminal 10.

Next, the call connection server 110 transmits a receiver authentication request to the information providing server 120. The receiver authentication server 122 of the information providing server 120 may determine whether or not a phone number (that is, a virtual number) of the receiver's terminal included in the call connection request signal transmitted from the caller's terminal 10 is a phone number of a subscriber subscribing to a service provided by the communication system 100 according to the exemplary embodiment of the present invention.

In the case in which it is determined that the phone number of the receiver's terminal 40 is the phone number of the subscriber subscribing to the service provided by the communication system 100, the information providing server 120 transmits an authentication approval signal to the call connection server 110.

On the other hand, although not shown, in the case in which it is determined that the phone number of the receiver's terminal 40 is not the phone number of the subscriber subscribing to the service provided by the communication system 100, the information providing server 120 transmits an authentication disapproval signal to the call connection server 110. In this case, the call connection server 110 may directly transmit the call connection request signal to the receiver's terminal 40.

Next, the information providing server 120 may detect a sound message corresponding to the virtual number of the receiver's terminal 40 included in the call connection request signal and transmit the detected sound message to the call connection server 110. In addition, the information providing server 120 may extract location information of the caller's terminal 10 included in the call connection request signal and a sound message matched to a current location of the caller's terminal 10 and transmit the extracted location information and sound message to the call connection server 110.

Next, the call connection server 110 receiving the sound message transmitted from the information providing server 120 may transmit a call connection reception request signal and the sound message to the receiver's terminal 40.

Next, the sound message is reproduced in the receiver's terminal 40. As described above, the sound message may include various types of messages such as a ring tone (for example, "ding dong dang"), a specific alarm sound (for example, "a call is made through xx communication system"), a logo song, and the like, that the receiver may hear at the time of receiving the call through the communication system 100. For example, in the case in which the call is received by the receiver's terminal 40, the sound message may be generally reproduced separately from or provided in addition to an output ring tone. In addition, for example, in the case in which the call is received by the receiver's terminal 40, the sound message may be generally reproduced simultaneously with or after the output ring tone.

For example, in the case in which a call is made to a virtual number 050-111-XXXX in the caller's terminal 10, a sound message such as "a call was received to a virtual number 050-111-XXXX written on an advertisement leaflet in order to sell food A" may be transmitted to the outside in the receiver's terminal 40. Alternately, in the case in which a call is made to a virtual number 050-222-XXXX in the caller's terminal 10, a sound message such as "a call was received to a virtual number 050-222-XXXX written on the Internet portal site in order to sell food B" may be transmitted to the outside in the receiver's terminal 40.

Next, the call connection server 110 may receive a call connection response signal transmitted from the receiver's terminal 40. Then, a voice call is made between the caller's terminal 10 and the receiver's terminal 40. During a call or after the call ends, a call record between the caller's terminal 10 and the receiver's terminal 40 may be stored.

As described above, according to the exemplary embodiment of the present invention, the sound message is transmitted to the user of the receiver's terminal 40, thereby making it possible to provide information on a route through which a call is made from the caller's terminal 10. In addition, after an advertisement is executed through a plurality of advertisement media, individual business contributions of the respective advertisement media may be accurately known. In addition, since an object of a call of the caller may be known as soon as the sound message is reproduced, the response to the customer may be facilitated and the customer satisfaction may be improved. Further, the plurality of virtual numbers are matched to one phone number, thereby making it possible to decrease a cost.

Figure 6:
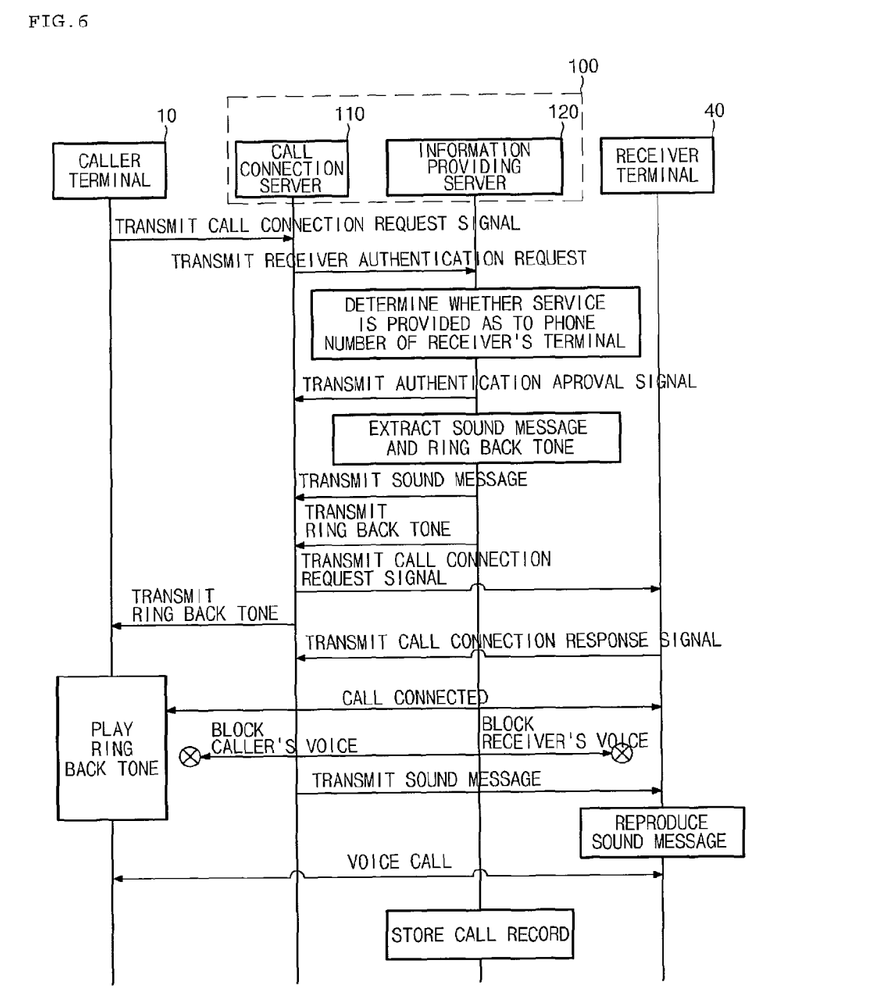
FIG. 6 is a flow chart showing a call connecting method of a communication system according to still another exemplary embodiment of the present invention.

FIG. 6 is a flow chart showing a call connecting method of a communication system according to still another exemplary embodiment of the present invention. As described above with reference to FIG. 4, it is assumed that the communication system 100 allocates one or more virtual numbers to the receiver's terminal in advance and sets and stores sound messages with respect to each of the virtual numbers.

First, a predetermined call connection request signal is transmitted from the caller's terminal 10 to the call connection server 110. The call connection request signal transmitted from the caller's terminal 10 includes phone number information of the receiver's terminal 40 of a receiver with which a caller wants to speak. Here, the phone number of the receiver's terminal 40 may be a virtual number set by the receiver.

Next, the call connection server 110 transmits a receiver authentication request to the information providing server 120. The receiver authentication server 122 of the information providing server 120 may determine whether or not a phone number (that is, a virtual number) of the receiver's terminal 40 included in the call connection request signal transmitted from the caller's terminal 10 is a phone number of a subscriber subscribing to a service provided by the communication system 100 according to the exemplary embodiment of the present invention.

In the case in which it is determined that the phone number of the receiver's terminal 40 is the phone number of the subscriber subscribing to the service provided by the communication system 100, the information providing server 120 transmits an authentication approval signal to the call connection server 110.

Next, the information providing server 120 may detect a sound message and/or a ring back tone corresponding to the virtual number of the receiver's terminal 40 included in the call connection request signal and transmit the detected sound message and/or ring back tone to the call connection server 110. In addition, the information providing server 120 may extract location information of the caller's terminal 10 included in the call connection request signal and a sound message matched to a current location of the caller's terminal 10 and transmit the extracted location information and sound message to the call connection server 110.

Next, the call connection server 110 receiving the sound message and/or the ring back tone transmitted from the information providing server 120 may transmit a call connection reception request signal to the receiver's terminal 40. For example, although not shown in FIG. 6, a general ring tone may be output in the receiver's terminal 40 receiving the call connection reception request signal.

At the same time or thereafter, the call connection server 110 may transmit a ring back tone to the caller's terminal 10. Therefore, the ring back tone will be reproduced in the caller's terminal 10.

Next, the call connection server 110 may receive a call connection response signal transmitted from the receiver's terminal 40 and start a call connection between the caller's terminal 10 and the receiver's terminal 40.

Next, the call connection server 110 may receive a sound message to the receiver's terminal 40. Therefore, the sound message is reproduced in the receiver's terminal 40. For example, in the case in which the call is received by the receiver's terminal 40, the sound message may be generally reproduced separately from or provided in addition to an output ring tone.

Meanwhile, even after the call connection between the caller's terminal 10 and the receiver's terminal 40 is made, the call connection server 110 may block transmission of voice between the caller's terminal 10 and the receiver's terminal 40 until reproduction of each of the ring back tone and the sound message in the caller's terminal 10 and the receiver's terminal 40 ends.

Further, the present invention is not limited thereto. That is, the call connection server 110 may also block transmission of voice between the caller's terminal 10 and the receiver's terminal 40 only until reproduction of the ring back tone in the caller's terminal 10 ends.

Next, a voice call is made between the caller's terminal 10 and the receiver's terminal 40. During a call or after the call ends, a call record between the caller's terminal 10 and the receiver's terminal 40 may be stored.

As described above, according to another exemplary embodiment of the present invention, the call connection server may block transmission of voice until reproduction of each of the ring back tone and the sound message in the caller's terminal 10 and the receiver's terminal 40 ends. That is, a user of the caller's terminal 10 may make a voice call with a user of the receiver's terminal 40 only after he/she hears the entire ring back tone. In addition, the user of the receiver's terminal 40 may also make the voice call with the user of the caller's terminal 10 only after he/she hears the entire sound message. Therefore, the user of the receiver's terminal 40 may maximize an advertisement effect using the ring back tone and a manager of the communication system 100 may certainly transmit a route of an incoming call to the user of the receiver's terminal 40 through the sound message.

According to the exemplary embodiment of the present invention, the sound message and the ring back tone are transmitted to the user of the receiver's terminal and the user of the caller's terminal, respectively, thereby making it possible to provide additional information (for example, receiver information, an order route, or the like).

In addition, according to the exemplary embodiment of the present invention, the user of the receiver's terminal may maximize the advertisement effect and the manager of the communication system may certainly transmit the route of the incoming call to the user of the receiver's terminal.

What is claimed is:

1. A communication system controlling a call connection between a caller's terminal and a receiver's terminal having one or more virtual numbers, comprising:
   a call connection server configured to perform the call connection between the caller's terminal and the receiver's terminal in response to a call connection request received from the caller's terminal; and
   an information providing server configured to detect a sound message and a ring back tone corresponding to a virtual number of the receiver's terminal included in the call connection request transmitted from the call connection server, outputting the detected sound message to the receiver's terminal, and outputting the detected ring back tone to the caller's terminal,
   wherein the call connection server blocks transmission of voice between the caller's terminal and the receiver's terminal until the output of at least any one of the ring back tone and the sound message ends after the receiver answers.

2. The communication system according to claim 1, wherein the call connection server blocks the transmission of the voice between the caller's terminal and the receiver's terminal until the output of at least any one of the ring back tone and the sound message ends in a state in which the call connection the caller's terminal and the receiver's terminal is made.

3. The communication system according to claim 1, wherein the information providing server determines whether a user of the receiver's terminal corresponds to a service subscriber using the virtual number of the receiver's terminal included in the call connection request.

4. The communication system according to claim 1, wherein the information providing server includes an location information processing server extracting location information of the caller's terminal included in the call connection request.

5. The communication system according to claim 4, wherein the information providing server includes a sound source providing server detecting the sound message and the ring back tone corresponding to the virtual number of the receiver's terminal.

6. The communication system according to claim 5, wherein the sound source providing server further detects a sound message corresponds to the location information of the caller's terminal.

7. The communication system according to claim 5, wherein the sound message and the ring back tone are preset in the sound source providing server.

8. The communication system according to claim 1, wherein the information providing server includes a call record storing server stores a call record between the caller's terminal and the receiver's terminal.

9. The communication system according to claim 1, wherein the ring back tone includes an advertisement sound or a logo song configured of voice or music.

10. A call connecting method of a communication system controlling a call connection between a caller's terminal and a receiver's terminal having one or more virtual numbers, comprising:
receiving a call connection request from the caller's terminal;
extracting a sound message and a ring back tone corresponding to a virtual number of the receiver's terminal included in the call connection request;
transmitting a call connection reception request to the receiver's terminal;
transmitting the ring back tone to the caller's terminal;
receiving a call connection response signal from the receiver's terminal and starting the call connection between the caller's terminal and the receiver's terminal; and
transmitting the sound message to the receiver's terminal,
wherein the communication system blocks transmission of voice between the caller's terminal and the receiver's terminal until the output of at least any one of the ring back tone and the sound message ends after the receiver answers.

11. The call connecting method of a communication system according to claim 10, wherein the sound message and the ring back tone are preset by the communication system.

12. The call connecting method of a communication system according to claim 10, further comprising determining whether a user of the receiver's terminal corresponds to a service subscriber using the virtual number of the receiver's terminal.

13. The call connecting method of a communication system according to claim 10, wherein the ring back tone includes an advertisement sound or a logo song configured of voice or music.

14. The communication system according to claim 1, wherein the sound message is equally set to one or more virtual numbers of the receiver's terminal.

* * * * *